(12) United States Patent
Chuang et al.

(10) Patent No.: US 9,992,512 B2
(45) Date of Patent: Jun. 5, 2018

(54) METHOD AND APPARATUS FOR MOTION VECTOR PREDICTOR DERIVATION

(71) Applicant: MEDIATEK INC., Hsin-Chu (TW)

(72) Inventors: Shun-Hsiang Chuang, Taipei (TW); Chih-Ming Wang, Hsinchu (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 101 days.

(21) Appl. No.: 14/872,147

(22) Filed: Oct. 1, 2015

(65) Prior Publication Data

US 2016/0100188 A1 Apr. 7, 2016

Related U.S. Application Data

(60) Provisional application No. 62/060,094, filed on Oct. 6, 2014.

(51) Int. Cl.
*H04N 19/577* (2014.01)
*H04N 19/176* (2014.01)
*H04N 19/105* (2014.01)
*H04N 19/52* (2014.01)
*H04N 19/96* (2014.01)
*H04N 19/58* (2014.01)

(52) U.S. Cl.
CPC ......... *H04N 19/577* (2014.11); *H04N 19/105* (2014.11); *H04N 19/176* (2014.11); *H04N 19/52* (2014.11); *H04N 19/58* (2014.11); *H04N 19/96* (2014.11)

(58) Field of Classification Search
CPC .... H04N 19/105; H04N 19/52; H04N 19/176; H04N 19/58; H04N 19/577; H04N 19/96
See application file for complete search history.

(56) References Cited

U.S. PATENT DOCUMENTS

| | | | |
|---|---|---|---|
| 2011/0293012 A1* | 12/2011 | Au | H04N 19/52 375/240.16 |
| 2012/0008688 A1 | 1/2012 | Tsai | |
| 2012/0128060 A1* | 5/2012 | Lin | H04N 19/00696 375/240.02 |
| 2012/0134415 A1 | 5/2012 | Lin | |
| 2012/0195368 A1* | 8/2012 | Chien | H04N 19/52 375/240.02 |
| 2013/0163668 A1* | 6/2013 | Chen | H04N 19/00696 375/240.14 |

(Continued)

FOREIGN PATENT DOCUMENTS

CN 102263947 A 11/2011
CN 102273206 A 12/2011
(Continued)

*Primary Examiner* — Zhihan Zhou
(74) *Attorney, Agent, or Firm* — Winston Hsu

(57) ABSTRACT

A method for motion vector predictor derivation of a block includes following steps: during a same-reference-frame stage of the motion vector predictor derivation, scanning a plurality of candidate motion vector predictors derived from neighbors of the block, and generating a determination result by determining if any candidate motion vector predictor is qualified for a different-reference-frame stage of the motion vector predictor derivation; and referring to the determination result to selectively enable the different-reference-frame stage following the same-reference-frame stage.

9 Claims, 12 Drawing Sheets

(56) References Cited

U.S. PATENT DOCUMENTS

| | | | |
|---|---|---|---|
| 2013/0272404 A1* | 10/2013 | Park | H04N 19/56 375/240.15 |
| 2014/0023144 A1* | 1/2014 | Park | H04N 19/56 375/240.16 |
| 2015/0071356 A1* | 3/2015 | Kim | H04N 19/513 375/240.16 |
| 2016/0014432 A1* | 1/2016 | Park | H04N 19/30 375/240.16 |

FOREIGN PATENT DOCUMENTS

| | | | |
|---|---|---|---|
| CN | 103339938 A | 10/2013 | |
| CN | 103535040 A | 1/2014 | |
| WO | WO 2012128540 A2 * | 9/2012 | H04N 19/56 |

* cited by examiner

METHOD AND APPARATUS FOR MOTION VECTOR PREDICTOR DERIVATION

CROSS REFERENCE TO RELATED APPLICATIONS

This application claims the benefit of U.S. provisional application No. 62/060,094, filed on Oct. 6, 2014 and incorporated herein by reference.

BACKGROUND

The disclosed embodiments of the present invention relate to video frame processing, and more particularly, to a method and apparatus for motion vector predictor derivation.

The conventional video coding standards generally adopt a block based coding technique to exploit spatial and temporal redundancy. For example, the basic approach is to divide the whole source frame into a plurality of blocks, perform prediction on each block, transform residues of each block using discrete cosine transform, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

Motion vectors are used by motion compensation to reconstruct the inter-frames. With regard to a video decoder, a motion vector (MV) of a current block may be derived from a motion vector predictor (MVP) and a motion vector difference (MVD). For example, the computation of the motion vector may be expressed using the following equation:

$$MV=MVP+MVD,$$

where the MVP of the current block may be determined from motion vector data of neighbor reconstructed blocks, and the MVD may be decoded from a bitstream by an entropy decoder such as a variable length decoder (VLD).

The performance of the motion vector computation depends on the MVP derivation. Consider a case where a small-sized block is further sub-divided into a plurality of sub-blocks, it may require extra time to find an MVP for each of the sub-blocks within the same block (e.g., 8×8 block). This may induce considerable timing overhead if an inter-frame is composed of a large number of sub-blocks. Thus, there is a need for an innovative design which is capable of solving the above-mentioned problem related to the MVP derivation.

SUMMARY

In accordance with exemplary embodiments of the present invention, a method and apparatus for improved motion vector predictor derivation (e.g., with improved computation efficiency) are proposed to solve the above-mentioned problem.

According to a first aspect of the present invention, an exemplary method for motion vector predictor derivation of a block is disclosed. The exemplary method includes: during a same-reference-frame stage of the motion vector predictor derivation, scanning a plurality of candidate motion vector predictors derived from neighbors of the block, and generating a determination result by determining if any candidate motion vector predictor is qualified for a different-reference-frame stage of the motion vector predictor derivation; and referring to the determination result to selectively enable the different-reference-frame stage following the same-reference-frame stage.

According to a second aspect of the present invention, an exemplary method for motion vector predictor derivation of a block is disclosed. The exemplary method includes: scanning a plurality of candidate motion vector predictors derived from at least a portion of neighbors of the block. The step of scanning the candidate motion vector predictors comprises: regarding one of the candidate motion vector predictors, selectively updating a first predictor list according to the candidate motion vector predictor when the candidate motion vector predictor points to a reference block in a designated reference frame of the block; and selectively updating a second predictor list according to the candidate motion vector predictor when the candidate motion vector predictor points to a reference block in a specific reference frame different from the designated reference frame of the block.

According to a third aspect of the present invention, an exemplary method for motion vector predictor derivation of a block is disclosed. The exemplary method includes: performing an L0 motion vector predictor derivation of the block in a compound motion vector mode; and performing an L1 motion vector predictor derivation of the block in the compound motion vector mode. The L0 motion vector predictor derivation and the L1 motion vector predictor derivation are performed in a parallel processing fashion.

According to a fourth aspect of the present invention, an exemplary motion vector predictor derivation apparatus is disclosed. The exemplary motion vector predictor derivation apparatus includes a motion vector predictor computing circuit and a checking circuit. The motion vector predictor computing circuit is arranged to scan a plurality of candidate motion vector predictors derived from neighbors of a block during a same-reference-frame stage of motion vector predictor derivation of the block, and arranged to refer to a determination result to selectively enable a different-reference-frame stage following the same-reference-frame stage. During the same-reference-frame stage of the motion vector predictor derivation, the checking circuit is arranged to generate the determination result by determining if any candidate motion vector predictor is qualified for the different-reference-frame stage of the motion vector predictor derivation.

According to a fifth aspect of the present invention, an exemplary motion vector predictor derivation apparatus is disclosed. The exemplary motion vector predictor derivation apparatus includes a storage device and a motion vector predictor computing circuit. The storage device is arranged to store a first predictor list and a second predictor list. The motion vector predictor computing circuit is arranged to scan a plurality of candidate motion vector predictors derived from at least a portion of neighbors of a block. Regarding one of the candidate motion vector predictors scanned, the motion vector predictor computing circuit selectively updates the first predictor list according to the candidate motion vector predictor when the candidate motion vector predictor points to a reference block in a designated reference frame of the block, and selectively updates the second predictor list according to the candidate motion vector predictor when the candidate motion vector predictor points to a reference block in a specific reference frame different from the designated reference frame of the block.

According to a sixth aspect of the present invention, an exemplary motion vector predictor derivation apparatus is disclosed. The exemplary motion vector predictor derivation apparatus includes a first motion vector predictor computing circuit and a second motion vector predictor computing circuit. The first motion vector predictor computing circuit is arranged to perform an L0 motion vector predictor derivation of a block in a compound motion vector mode. The second motion vector predictor computing circuit is arranged to perform an L1 motion vector predictor derivation of the block in the compound motion vector mode. The L0 motion vector predictor derivation and the L1 motion vector predictor derivation are performed by the first motion vector predictor computing circuit and the second motion vector predictor computing circuit in a parallel processing fashion.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
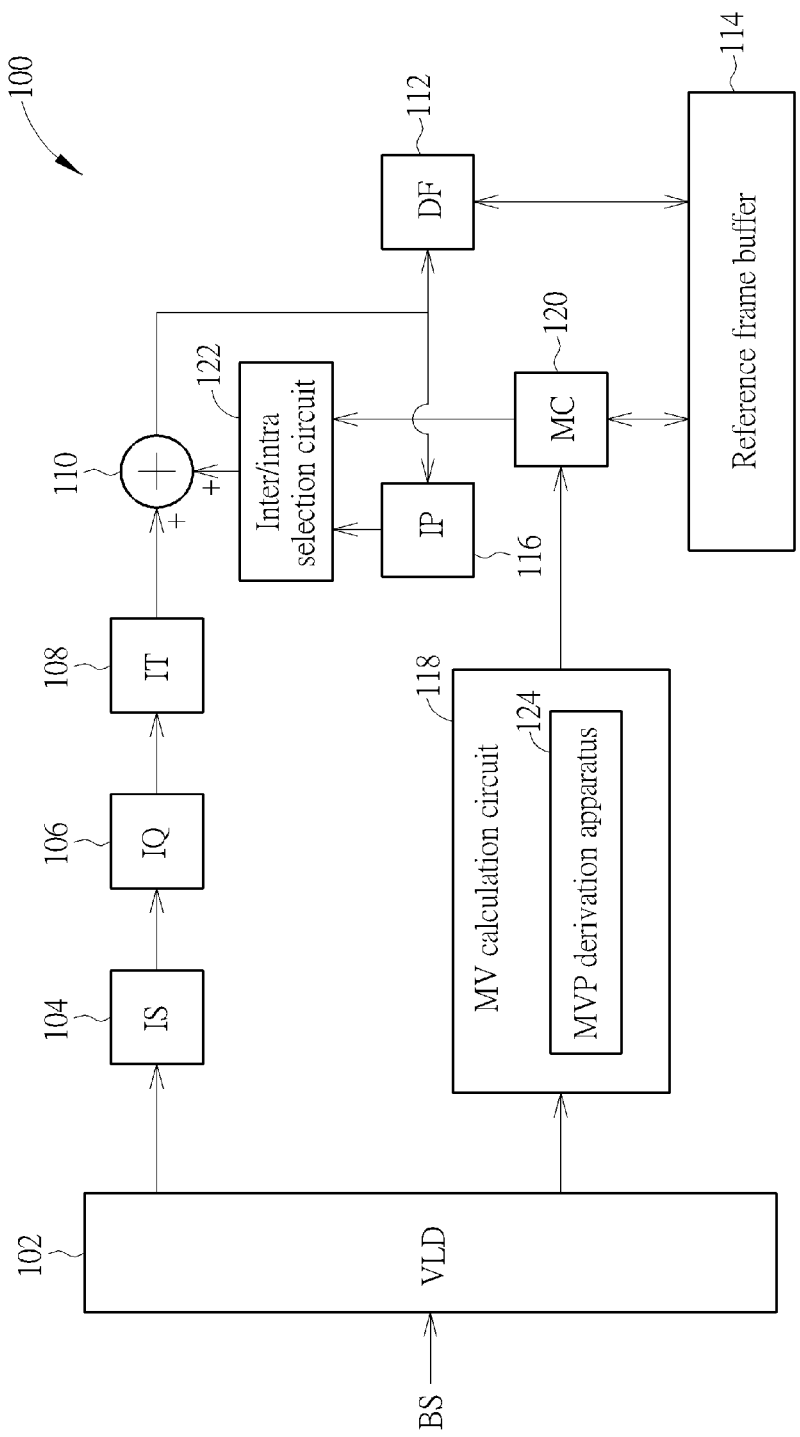
FIG. 1 is a diagram illustrating a video decoder according to an embodiment of the present invention.

FIG. 1 is a diagram illustrating a video decoder according to an embodiment of the present invention. The video decoder 100 may be part of an electronic device, such as a personal computer (e.g., a laptop computer or a desktop computer), a mobile phone, a tablet, or a wearable device. The video decoder 100 is arranged for decoding a bitstream BS to generate a video sequence composed of a plurality of consecutive decoded frames (i.e., reconstructed frames). At least a portion (i.e., part or all) of the video decoder 100 may be implemented in an integrated circuit (IC). To put it simply, any electronic device or electronic system using the proposed video decoder 100 falls within the scope of the present invention.

As shown in FIG. 1, the video decoder 100 includes an entropy decoder (e.g., a variable-length decoder (VLD) 102), an inverse scan circuit (denoted as "IS") 104, an inverse quantization circuit (denoted as "IQ") 106, an inverse transform circuit (denoted as "IT") 108, a reconstruct circuit 110, at least one in-loop filter (e.g., a de-blocking filter (DF) 112), a reference frame buffer 114, an intra prediction circuit (denoted as "IP") 116, a motion vector (MV) calculation circuit 118, a motion compensation circuit (denoted as "MC") 120, and an intra/inter selection circuit 122. The reference frame buffer 114 may be an external storage device such as an off-chip dynamic random access memory (DRAM). In this embodiment, the MV calculation circuit 118 includes a motion vector predictor (MVP) derivation apparatus 124 with improved MVP derivation. Further details of the proposed MVP derivation apparatus 124 will be described later. It should be noted that the MV calculation circuit 118 may include other circuits (not shown) for generating an MV according to an MVP provided by the MVP derivation apparatus 124 and an MVD decoded from the bitstream BS by the VLD 102.

By way of example, but not limitation, the video decoder 100 may be used to decode the incoming bitstream BS generated using a VP9 coding standard that is an open and royalty-free video coding standard being developed by Google®. However, this is for illustrative purposes only, and is not meant to be a limitation of the present invention. Any video decoder using the proposed video decoder structure, particularly the proposed MVP derivation apparatus 122 with improved MVP derivation, falls within the scope of the present invention.

The VLD 102 is arranged to apply entropy decoding to the incoming bitstream BS for generating intra/inter mode information (e.g., motion vector differences of inter prediction) and residues. The residues are transmitted to the reconstruct circuit 110 through being inverse scanned (which is performed at the inverse scan circuit 104), inverse quantized (which is performed at the inverse quantization circuit 106), and inverse transformed (which is performed at the inverse transform circuit 108).

The inter/intra selection circuit 122 is controlled according to a prediction mode of a current block to be decoded. For example, when the prediction mode of the current block is decided to be inter prediction, predicted pixels/samples generated from the motion compensation circuit 120 are output to the following decoding stage, such as a reconstruct circuit 110. For another example, when the prediction mode of the current block is decided to be intra prediction, predicted pixels/samples generated from the intra prediction circuit 116 are output to the following decoding stage, such as the reconstruct circuit 110.

The reconstruct circuit 110 is arranged to combine a residue output of the inverse transform circuit 108 and a predicted pixel output of one of intra prediction circuit 116 and motion compensation circuit 120 to thereby generate reconstructed pixels/samples of each block of a frame (i.e., a reconstructed/decoded frame). The de-blocking filter 112 is arranged to apply de-blocking filtering to the reconstructed frame generated from the reconstruct circuit 110, and then generate a de-blocked frame as a reference frame. The de-blocked reference frame is stored into the reference frame buffer 114, and may be referenced by the motion compensation circuit 120 to generate predicted pixels/samples.

Figure 2:
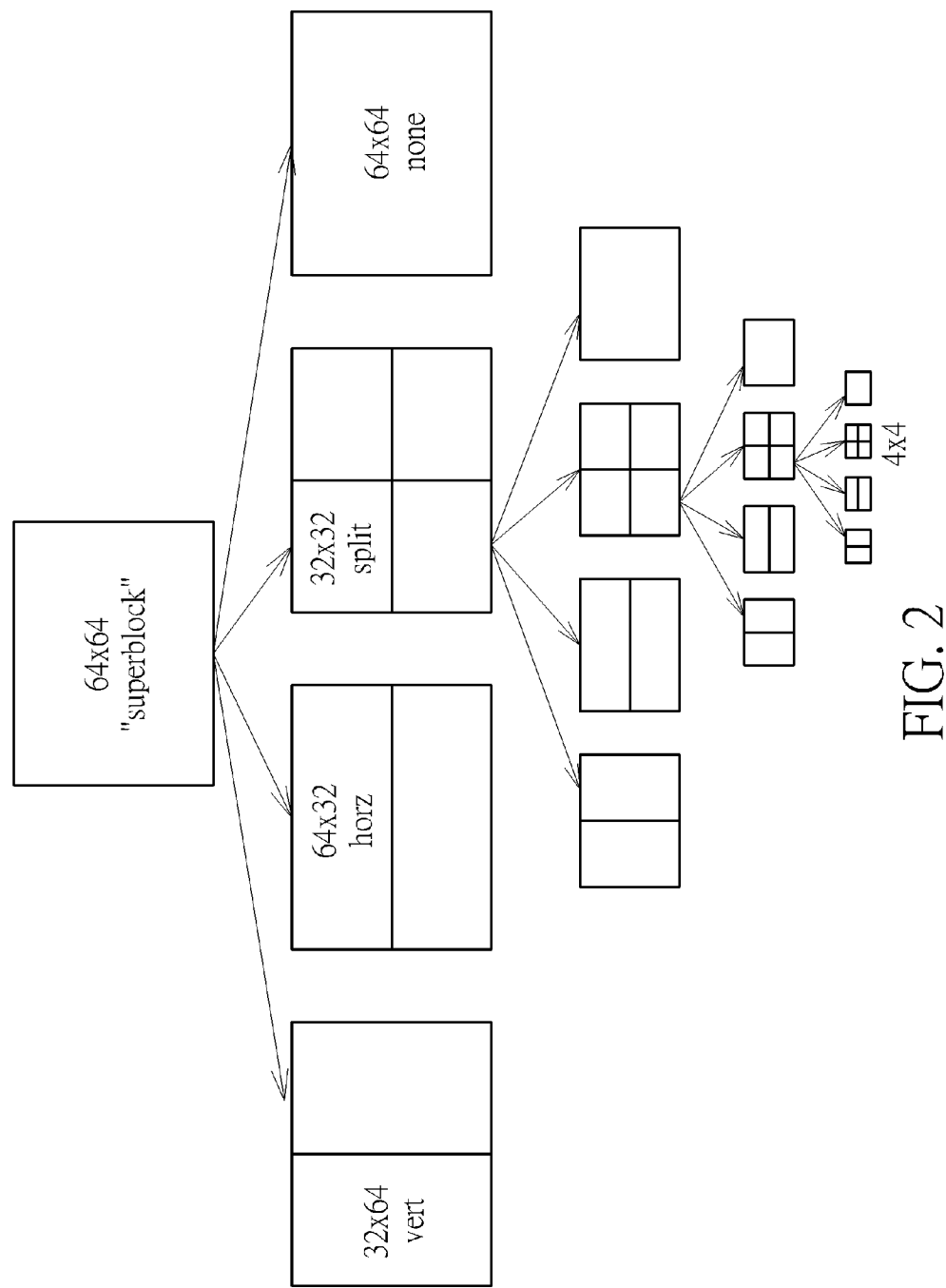
FIG. 2 is a diagram illustrating recursive partitioning of one superblock into various sizes of mode information units.

VP9 divides one frame into 64×64-sized blocks that are called superblocks (SBs). Superblocks of the frame are processed in raster order: left to right, top to bottom. In addition, VP9 supports quad-tree based encoding. Hence, recursive partitioning may be employed to split each superblock into one or more partitions (e.g., smaller-sized blocks) for further processing. FIG. 2 is a diagram illustrating recursive partitioning of one superblock into various sizes of mode information (MI) units. For example, one superblock with the block size of 64×64 may be split into one or more coding units (or called MI units), where the partitions supported by VP9 coding standard may include square partitions, such as a 64×64-sized block, a 32×32-sized block, a 16×16-sized block, a 8×8-sized block, a 4×4-sized block, and may further include non-square partitions, such as a 64×32-sized block, a 32×64-sized block, 32×16-sized block, a 16×32-sized block, . . . , a 4×8-sized block, a 8×4-sized block. Hence, the coding unit (MI unit) sizes may include 64×64, 32×32, 16×16, 8×8, 64×32, 32×64, 32×16, 16×32, . . . , 8×8, 4×8, 8×4, 4×4. Although "4×4" is the smallest partition, lots of information is stored at "8×8" granularity only. This causes blocks smaller than "8×8" to be handled as sort of a special case.

For any MI unit size, VP9 will perform a best MVP derivation flow to find one best MVP. In other words, the best MVP derivation flow is performed for each block regardless of the block size. In a case where an MI unit size is not smaller than 8×8, the best MVP is directly referenced to determine an MV of a block with the MI unit size. In another case where an MI unit size is smaller than 8×8, an additional sub-block MVP derivation flow will be performed to find one sub-block MVP for each sub-block within one 8×8 block, where the best MVP and the sub-block MVP of a sub-block with the MI unit size may be involved in determining an MV of the sub-block within the 8×8 block. For example, when the MI unit size is 4×4, one 8×8 block is composed of four square sub-blocks (i.e., 4×4 sub-blocks). Hence, 4 iterations of the sub-block MVP derivation flow are required to determine sub-block MVPs of the four 4×4 sub-blocks, respectively. For another example, when the MI unit size is 4×8, one 8×8 block is composed of two non-square sub-blocks (i.e., 4×8 sub-blocks). Hence, 2 iterations of the sub-block MVP derivation flow are required to determine sub-block MVPs of the two 4×8 sub-blocks, respectively. For yet another example, when the MI unit size is 8×4, one 8×8 block is composed of two non-square sub-blocks (i.e., 8×4 sub-blocks). Hence, 2 iterations of the sub-block MVP derivation flow are required to determine sub-block MVPs of the two 8×4 sub-blocks, respectively. The numbers of iterations for finding MVPs indifferent MI unit sizes are listed in the following table.

TABLE 1

| MI Unit Size | Best MVP | Sub-block MVP | Total |
|---|---|---|---|
| MI ≥ 8 × 8 | 1 | 0 | 1 |
| MI = 4 × 8 | 1 | 2 | 3 |
| MI = 8 × 4 | 1 | 2 | 3 |
| MI = 4 × 4 | 1 | 4 | 5 |

For MI unit size<8×8, VP9 requires extra time to find the sub-block MVPs compared to the condition of MI≥8×8. This might induce considerable timing overhead if an inter-frame is composed of a large number of MI units smaller than 8×8. The present invention therefore proposes using the MVP derivation apparatus 124 to improve the best MVP derivation flow and the sub-block MVP derivation flow.

Figure 12:
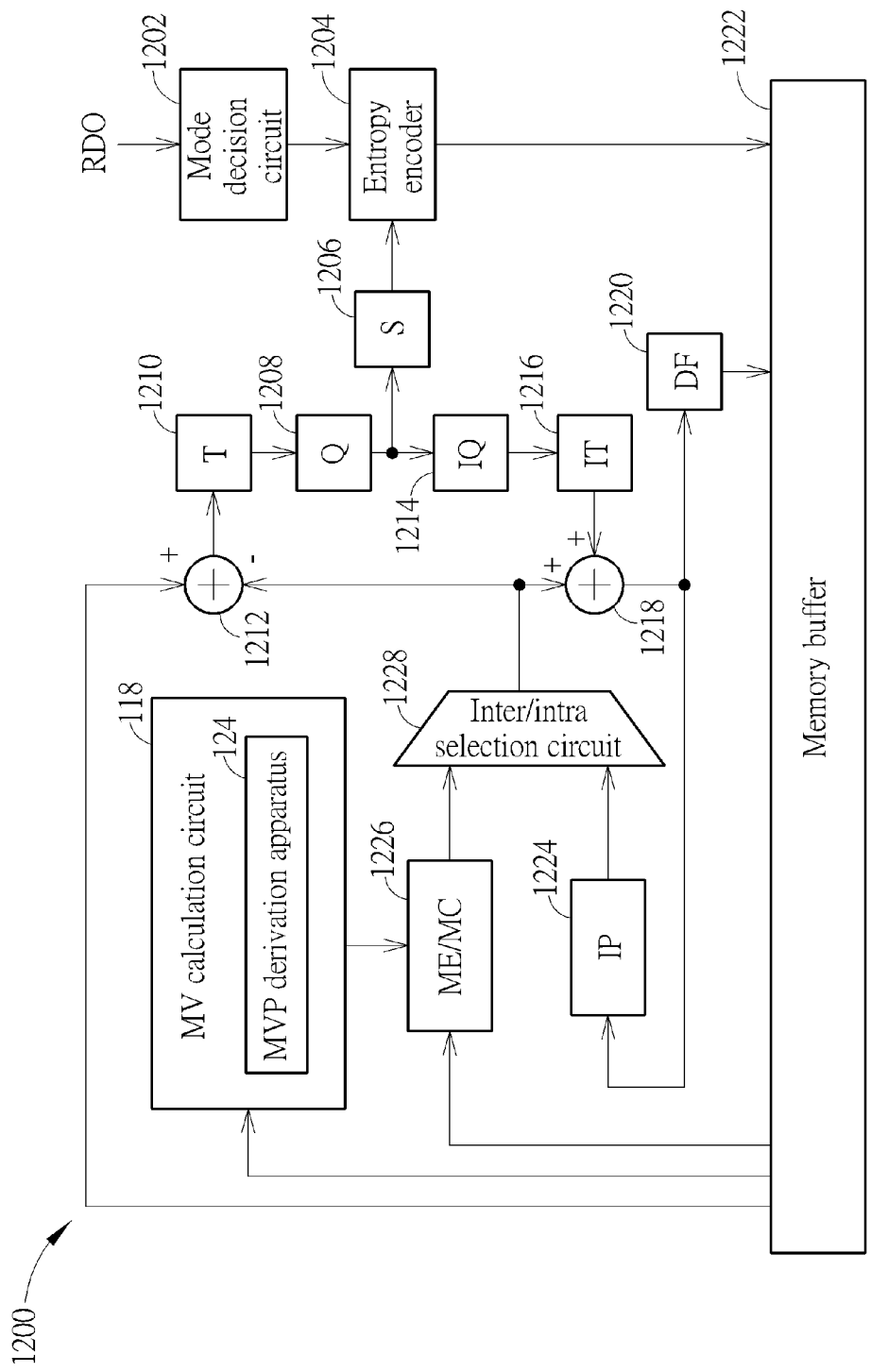
FIG. 12 is a diagram illustrating a video encoder according to an embodiment of the present invention.

For clarity and simplicity, the following assumes that the proposed MVP derivation scheme is employed by a video decoder (e.g., video decoder 100 shown in FIG. 1). However, this is for illustrative purposes only, and is not meant to be a limitation of the present invention. In some other embodiments, such MVP derivation apparatus may be applied in a video encoder, which should not be limited in this disclosure. FIG. 12 is a diagram illustrating a video encoder according to an embodiment of the present invention. The video encoder 1200 includes the MV calculation circuit 118 having the proposed MVP derivation apparatus 124, and further includes typical encoder components. For example, the typical encoder components may include a mode decision circuit 1202 (which is used to select a best coding mode based on rate-distortion optimization (RDO)), an entropy encoder (e.g., a variable-length encoder) 1204, a scan circuit (denoted by "S") 1206 (which is used to reorder quantized transform coefficients), a quantization circuit (denoted by "Q") 1208, a transform circuit (denoted by "T") 1210, a residue calculation circuit 1212, an inverse quantization circuit (denoted as "IQ") 1214, an inverse transform circuit (denoted as "IT") 1216, a reconstruct circuit 1218, at least one in-loop filter (e.g., a de-blocking filter (DF) 1220), a memory buffer 1222, an intra prediction circuit (denoted as "IP") 1224, a motion estimation/compensation circuit (denoted as "ME/MC") 1226, and an intra/inter selection circuit 1228. As a person skilled in the pertinent art can readily understand details of the typical encoder components, further description is omitted here for brevity.

Figure 3:
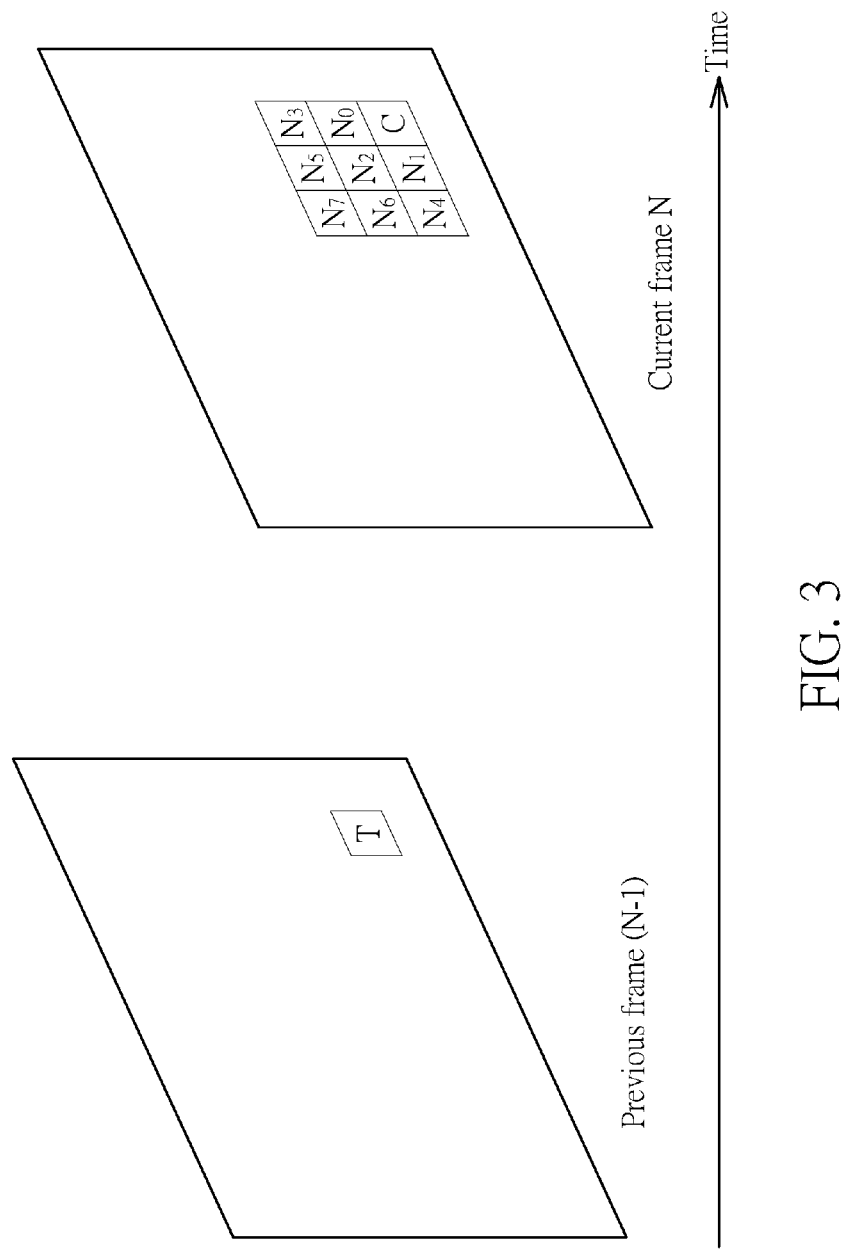
FIG. 3 is a diagram illustrating an example of neighbors of a current block (e.g., a current MI unit) according to an embodiment of the present invention.

The MVP derivation principle for determining a best MVP is the same as the MVP derivation principle of a sub-block MVP. For example, an MVP derivation of a current block with an MI unit size may be divided into two major steps, one is a same-reference-frame stage and the other is a different-reference-frame stage. Each of the same-reference-frame stage and the different-reference-frame stage of MVP derivation of the current block relies on MVs of nearby reconstructed blocks that serve as candidate MVPs for the current block. FIG. 3 is a diagram illustrating an example of neighbors of a current block (e.g., a current MI unit) according to an embodiment of the present invention. The MVP derivation of a current block C in a current frame N may require MV data of 8 spatial neighbors $N_0$-$N_7$ in the same current frame N and one temporal (co-located) neighbor T in a previous frame (N−1) immediately preceding the current frame N. The temporal neighbor T is one block in the previous frame (N−1) that has the same location as that possessed by the current block C in the current frame N. In a case where a block size (MI unit size) is 8×8, (row, column) positions relative to the current block may be (−1, 0), (0, −1), (−1, −1), (−2, 0), (0, −2), (−2, −1), (−1, −2) and (−2, −2) for the spatial neighbors $N_0$-$N_7$ as illustrated in FIG. 3. In practice, the spatial neighbors are determined by a look-up table based on the block size (MI unit size). Hence, (row, column) positions relative to the current block under different block sizes (MI unit sizes) may have different settings.

Figure 4:
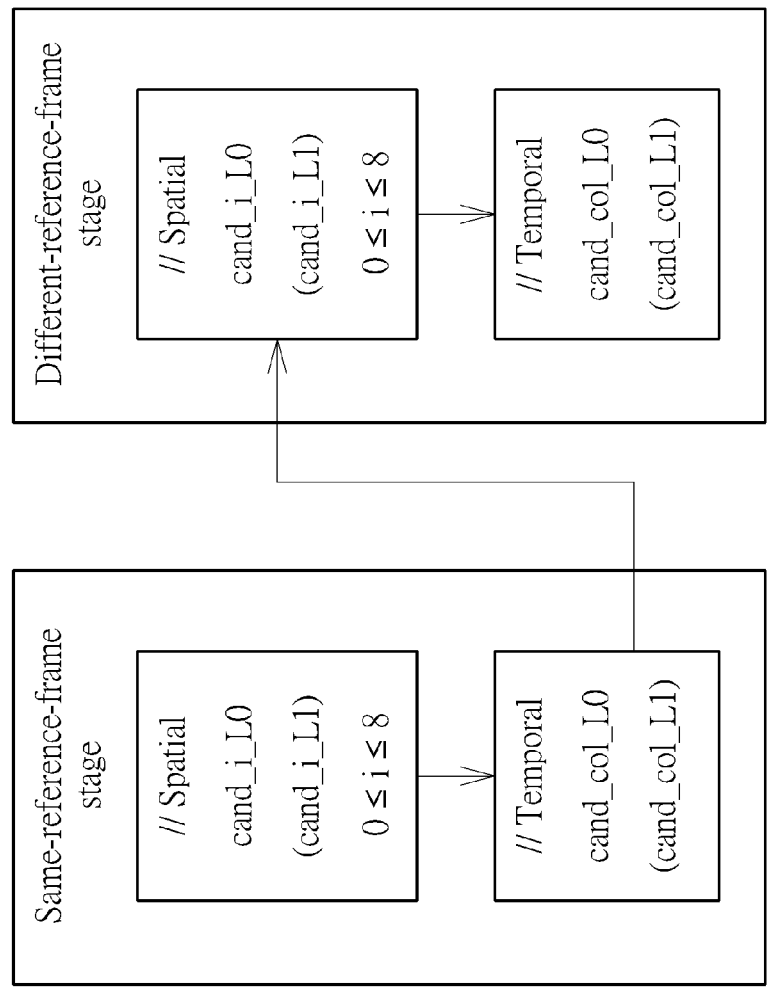
FIG. 4 is a diagram illustrating a priority-based motion vector predictor derivation according to an embodiment of the present invention.

The same-reference-frame stage and the different-reference-frame stage of MVP derivation of one block are performed in order. FIG. 4 is a diagram illustrating a priority-based MVP derivation according to an embodiment of the present invention. Syntax elements derived from processing the bitstream BS may include information indicative of a designated reference frame for a current block to be decoded under an inter-prediction mode. The first MVP derivation stage (i.e., same-reference-frame stage) is performed to search for reference MVPs that point to reference blocks within the same designated reference frame. The priority of scanning candidate MVPs (denoted by cand_i_L0) of eight spatial neighbors (e.g., $N_0$-$N_7$ shown in FIG. 3) may be higher than the priority of scanning a candidate MVP (denoted by cand_col_L0) of one temporal neighbor (e.g., T shown in FIG. 3), and candidate MVPs of eight spatial neighbors (e.g., $N_0$-$N_7$ shown in FIG. 3) may be scanned in order. Any candidate MVP pointing to the designated reference frame and/or satisfying a predetermined criterion is identified as a valid reference MVP and added to a predictor list.

If the same-reference-frame stage is able to fill the predictor list by finding sufficient candidate MVPs (e.g., two candidate MVPs) that can be qualified as valid reference MVPs, the following different-reference-frame stage is skipped. For example, a candidate MVP of a neighbor may be regarded as being qualified as a valid reference MVP if the neighbor is in inter mode and/or is not across a tile boundary. However, if the same-reference-frame stage fails to fill the predictor list by finding sufficient candidate MVPs (e.g., two candidate MVPs) that can be qualified as valid reference MVPs, the following different-reference-frame stage is performed.

The second MVP derivation stage (i.e., different-reference-frame stage) is performed to search for reference MVPs that point to reference blocks within a reference frame different from the designated reference frame. The priority of scanning candidate MVPs (denoted by cand_i_L0) of eight spatial neighbors (e.g., $N_0$-$N_7$ shown in FIG. 3) may be higher than the priority of scanning a candidate MVP (denoted by cand_col_L0) of one temporal neighbor (e.g., T shown in FIG. 3), and candidate MVPs of eight spatial neighbors (e.g., $N_0$-$N_7$ shown in FIG. 3) may be scanned in order. Any candidate MVP pointing to a different reference frame (which is not the designated reference frame) and/or satisfying a predetermined criterion is processed by a predetermined operation (e.g., a scaling operation) to generate a valid reference MVP to the predictor list. If the predictor list is still not full after the different-reference-frame stage, (0, 0) vector(s) may be used.

The predictor list may be a 2-entry list used to record the most and the second most likely motion vectors for the current block that are obtained by a survey of candidate MVPs of neighbors of the current block. In one exemplary implementation of the priority-based MVP derivation, the searching operation involved in MVP derivation is terminated once two reference MVPs are found and added to the 2-entry predictor list during the same-reference-frame stage and/or the different-reference-frame stage. However, this is for illustrative purposes, and is not meant to be a limitation of the present invention.

For each inter-coded block, either a single MV mode or a compound MV mode may be used. In a case where the single MV mode is used, only a single reference MVP (MV, Ref) derived from MV data of neighbors is needed for setting an MV of the current block. In another case where the compound MV mode is used, two reference MVPs (MV1, Ref1) and (MV2, Ref2) derived from MV data of neighbors are needed for setting an MV of the current block. The manner of searching for each of the reference MVPs (MV1, Ref1) and (MV2, Ref2) in the compound MV mode is the same as that used for searching for the reference MVP (MV, Ref) in the single MV mode. For example, if the compound MV mode is employed for inter-prediction, two candidate MVPs (denoted by cand_i_L0 and cand_i_L1) may be checked for each of eight spatial neighbors (e.g., $N_0$-$N_7$ shown in FIG. 3) and two candidate MVPs (denoted by cand_col_L0 and cand_col_L1) may be checked for one temporal neighbor (e.g., T shown in FIG. 3) during any of the same-reference-frame stage and the different-reference-frame stage.

If all of the neighbors, including eight spatial neighbors (e.g., $N_0$-$N_7$ shown in FIG. 3) and one temporal neighbor (e.g., T shown in FIG. 3), are scheduled to be checked in order during the second MVP derivation stage (i.e., different-reference-frame stage), such an MVP derivation design has high computation complexity due to extra calculations performed in the second MVP derivation stage (i.e., different-reference-frame stage). The present invention therefore proposes an innovative MVP derivation flow. Several exemplary MVP derivation flows are described as below.

Figure 5:
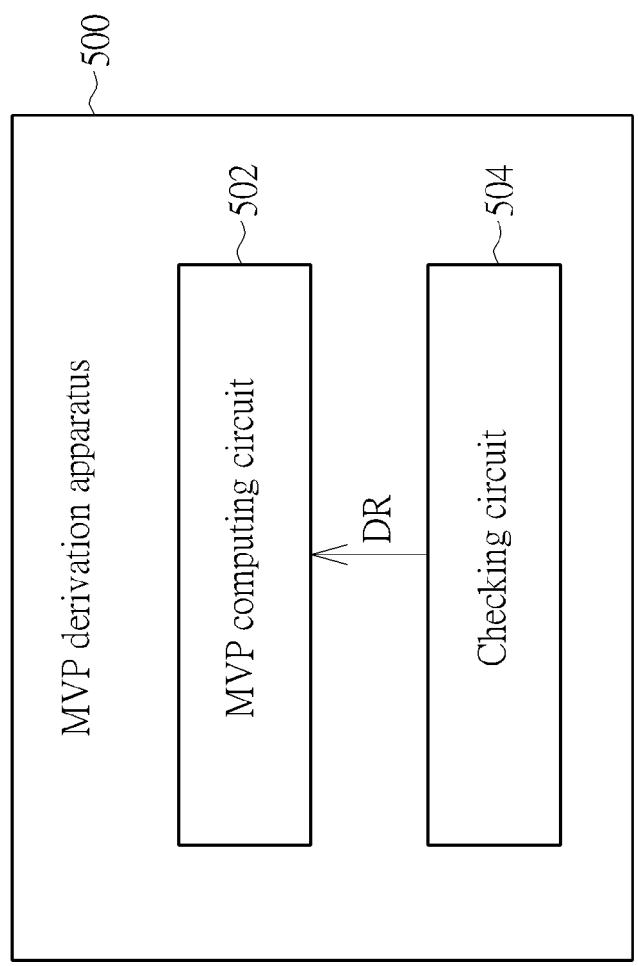
FIG. 5 is a diagram illustrating a first motion vector predictor derivation apparatus according to an embodiment of the present invention.

FIG. 5 is a diagram illustrating a first MVP derivation apparatus according to an embodiment of the present invention. For example, the MVP derivation apparatus 124 shown in FIG. 1 may be implemented using the MVP derivation apparatus 500 shown in FIG. 5. As shown in FIG. 5, the MVP derivation apparatus 500 includes an MVP computing circuit 502 and a checking circuit 504. The MVP derivation apparatus 500 is arranged to scan a plurality of candidate MVPs derived from neighbors of a block during a same-reference-frame stage of MVP derivation of the block, and arranged to refer to a determination result DR to selectively enable a different-reference-frame stage following the same-reference-frame stage. During the same-reference-frame stage of the MVP derivation, the checking circuit 504 is arranged to generate the determination result DR by determining if any candidate MVP is qualified for the different-reference-frame stage of the MVP derivation. It should be noted that proposed MVP derivation may be employed in one or both of the best MVP derivation flow and the sub-block MVP derivation flow.

To put it another way, the MVP derivation apparatus 500 may be configured to reduce the computation complexity of the MVP derivation according to a first design. In accordance with the first design, given an MI unit with 8 spatial candidate motion vector data $cand_i$, where $0 \leq i < 8$, and 1 temporal (co-located) candidate motion vector data col, while deriving reference MVPs during the same-reference-frame stage, $cand_i$ and col can be checked to see whether they are qualified for the following different-reference-frame stage. Therefore, during the different-reference-frame stage that is performed due to the same-reference-frame stage failing to fill a predictor list (e.g., a 2-entry predictor list), only k candidate motion vector data should be scanned, where $k \leq i+1$. For example, at least one of the spatial candidate motion vector data $cand_i$ can be skipped in the different-reference-frame stage if it is not qualified for the different-reference-frame stage, and/or the temporal candidate motion vector data col can be skipped in the different-reference-frame stage if it is not qualified for the different-reference-frame stage. Hence, when the first design is employed, the MVP computing circuit 502 of the MVP derivation apparatus 500 can skip redundant searching to efficiently reduce the processing time needed by the MVP derivation.

Figure 6:
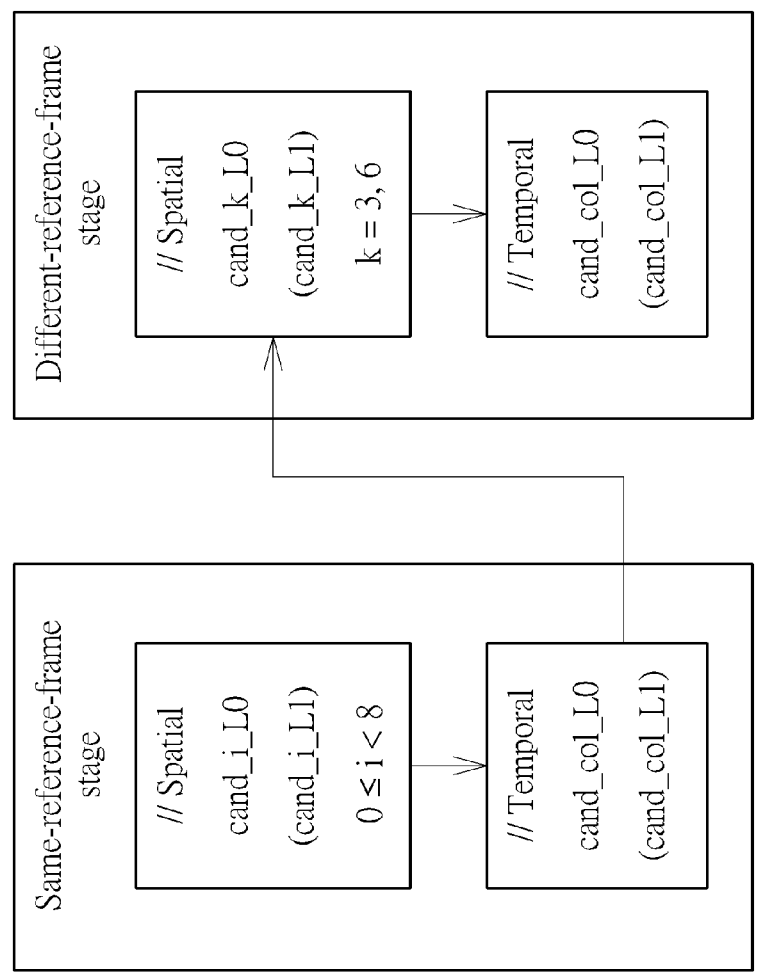
FIG. 6 is a diagram illustrating a first motion vector predictor derivation example according to the first design.

FIG. 6 is a diagram illustrating a first MVP derivation example according to the first design. During the same-reference-frame stage, the MVP computing circuit 502 performs the MVP searching upon candidate MVPs derived from spatial neighbors and the temporal neighbor, and the checking circuit 504 generates the determination result DR by keeping track of at least one candidate MVP qualified for the different-reference-frame stage due to not pointing to a designated reference frame of a current block to be decoded. During the different-reference-frame stage following the same-reference-frame stage, the MVP computing circuit 502 scans the at least one candidate MVP determined in the same-reference-frame stage only. In other words, the MVP searching of the different-reference-frame stage can bypass any invalid candidate MVP, thus accelerating the flow for the MVP derivation.

For example, syntax elements derived from processing a bitstream may include information indicative of a designated reference frame for a current block to be decoded in an inter-prediction mode. The first MVP derivation stage (i.e., same-reference-frame stage) is performed to search for reference MVPs within the same designated reference frame. For example, the priority of scanning candidate MVPs (denoted by cand_i_L0) of eight spatial neighbors (e.g., $N_0$-$N_7$ shown in FIG. 3) may be higher than the priority of scanning a candidate MVP (denoted by cand_col_L0) of one temporal neighbor (e.g., T shown in FIG. 3), and candidate MVPs of eight spatial neighbors (e.g., $N_0$-$N_7$ shown in FIG. 3) may be scanned in order. Any candidate MVP pointing to a reference block within the designated reference frame and/or satisfying a predetermined criterion is identified as a valid reference MVP and added to a predictor list (e.g., a 2-entry predictor list). The same-reference-frame stage is terminated once two reference MVPs are found and added to the 2-entry predictor list. Supposing that the same-reference-frame stage fails to find two reference MVPs, the following different-reference-frame stage is performed by the MVP computing circuit 502.

In this example, during the same-reference-frame stage, the checking circuit 504 finds that candidate MVPs (denoted by cand_3_L0 and cand_6_L0) of the spatial neighbors $N_3$ and $N_6$ and the candidate MVP (denoted by cand_col_L0) of the temporal neighbor T are qualified for the different-reference-frame stage, and generates the determination result DR to inform the MVP computing circuit 502 of the candidate MVPs qualified for the following different-reference-frame stage.

The second MVP derivation stage (i.e., different-reference-frame stage) is performed to search for reference MVPs pointing to reference blocks within reference frames different from the designated reference frame of the current block to be decoded. Among candidate MVPs of the spatial neighbors and the temporal neighbor, only the candidate MVPs cand_3_L0, cand_6_L0 and cand_col_Lo are scheduled to be checked in order during the second MVP derivation stage (i.e., different-reference-frame stage).

Figure 7:
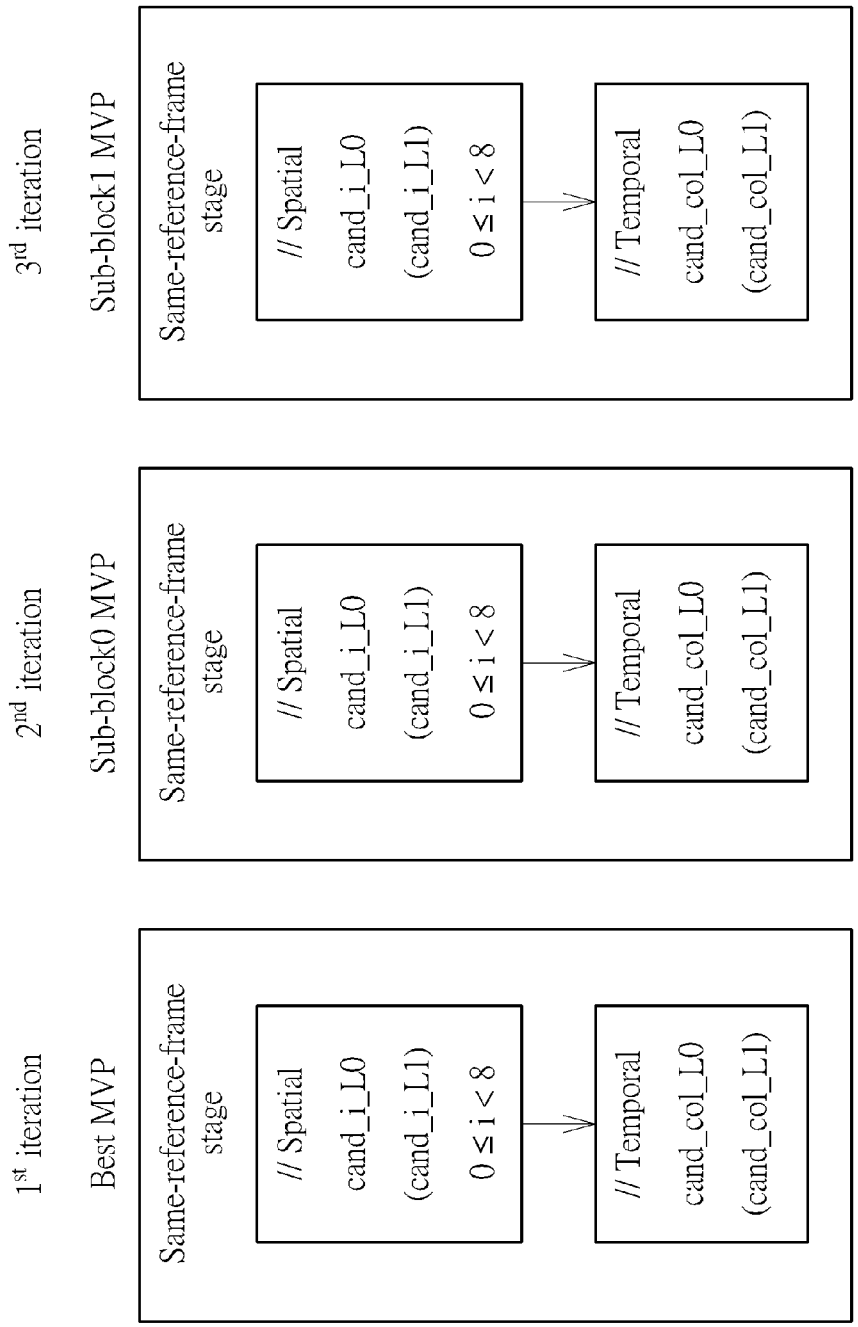
FIG. 7 is a diagram illustrating a second motion vector predictor derivation example according to the first design.

FIG. 7 is a diagram illustrating a second MVP derivation example according to the first design. In this example, the determination result DP generated from the checking circuit 504 to the MVP computing circuit 502 indicates that none of the candidate MVPs (denoted by cand_i_L0 and cand_col_L0) derived from the neighbors (e.g., $N_0$-$N_7$ and T shown in FIG. 3) of the current block (e.g., C shown in FIG. 3) is qualified for the following different-reference-frame stage. Hence, the MVP computing circuit 502 skips the different-reference-frame stage. Suppose that the size of the current block is 4×8, the MVP derivation flow includes a best MVP derivation flow and two sub-block MVP derivation flows. If all of the candidate MVPs derived from the spatial neighbors and the temporal neighbor are found unqualified for the different-reference-frame stage of the best MVP derivation flow during the same-reference-frame stage of the best MVP derivation flow, all of the different-reference-frame stages may be skipped by the MVP computing circuit 502 in the best MVP derivation flow and the sub-block MVP derivation flows, as illustrated in FIG. 7.

It should be noted that, if a compound MV mode is employed, two candidate MVPs (denoted by cand_i_L0 and cand_i_L1) may be checked for each of eight spatial neighbors (e.g., $N_0$-$N_7$) and two candidate MVPs (denoted by cand_col_L0 and cand_col_L1) may be checked for one temporal neighbor (e.g., T). The same technique of skipping redundant searching of unqualified candidate MVPs in the second MVP derivation stage (i.e., different-reference-frame stage) can be applied to each of the L0 MVP derivation and the L1 MVP derivation. This also falls within the scope of the present invention.

Figure 8:
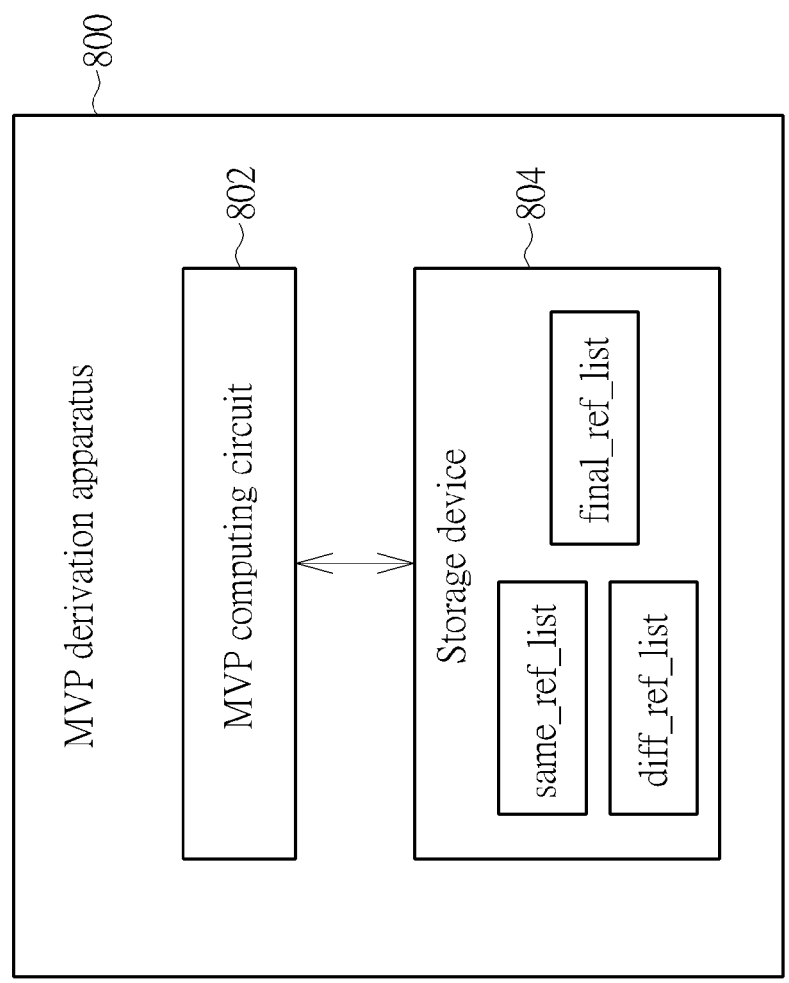
FIG. 8 is a diagram illustrating a second motion vector predictor derivation apparatus according to an embodiment of the present invention.

FIG. 8 is a diagram illustrating a second MVP derivation apparatus according to an embodiment of the present invention. For example, the MVP derivation apparatus 124 shown in FIG. 1 may be implemented using the MVP derivation apparatus 800 shown in FIG. 8. As shown in FIG. 8, the MVP derivation apparatus 800 includes an MVP computing circuit 802 and a storage device 804. The storage device 804 is arranged to store a first predictor list same_ref_list, a second predictor list diff_ref_list, and a final predictor list final_ref_list. The MVP computing circuit 802 is arranged to sequentially scan a plurality of candidate MVPs derived from at least a portion of neighbors (e.g., eight spatial neighbors and one temporal neighbor) of a current block to be decoded in the inter-prediction mode. Regarding one of the candidate MVPs sequentially scanned, the MVP computing circuit 802 selectively updates the first predictor list same_ref_list according to the candidate MVP when the candidate MVP points to a reference block in a designated reference frame of the current block, and selectively updates the second predictor list diff_ref_list according to the candidate MVP when the candidate MVP points to a reference block in a specific reference frame different from the designated reference frame of the current block.

For example, when a candidate MVP of one neighbor points to the designated reference frame of the current block and is found qualified as a valid reference MVP, the candidate MVP is added to the first predictor list same_ref_list. For another example, when the candidate MVP of one neighbor points to a different reference frame (which is not the designated reference frame of the current block) and is found qualified as a valid reference MVP, the candidate MVP is added to the second predictor list diff_ref_list. To put it simply, any of the first predictor list same_ref_list and the second predictor list diff_ref_list may be updated by a candidate MVP of one neighbor if the candidate MVP is qualified as a valid reference MVP that should be added to a predictor list.

In addition, after all of the candidate MVPs are sequentially scanned, the MVP computing circuit 802 determines at least one candidate MVP in the final predictor list final_ref_list according to the first predictor list same_ref_list and the second predictor list diff_ref_list.

To put it another way, the MVP derivation apparatus 800 may be configured to reduce the computation complexity of the MVP derivation according to a second design. In accordance with the second design, given an MI unit with 8 spatial candidate motion vector data $cand_i$, where $0 \leq i < 8$, and 1 temporal (co-located) candidate motion vector data col, during the first stage of MVP derivation, each of $cand_i$ and col is checked to see whether it can be added to any of same_ref_list and diff_ref_list and added to one of same_ref_list and diff_ref_list if it should be recorded, and after the first stage is complete, final_ref_list is determined according to same_ref_list and diff_ref_list, such that the whole second stage of MVP derivation can be skipped.

Figure 9:
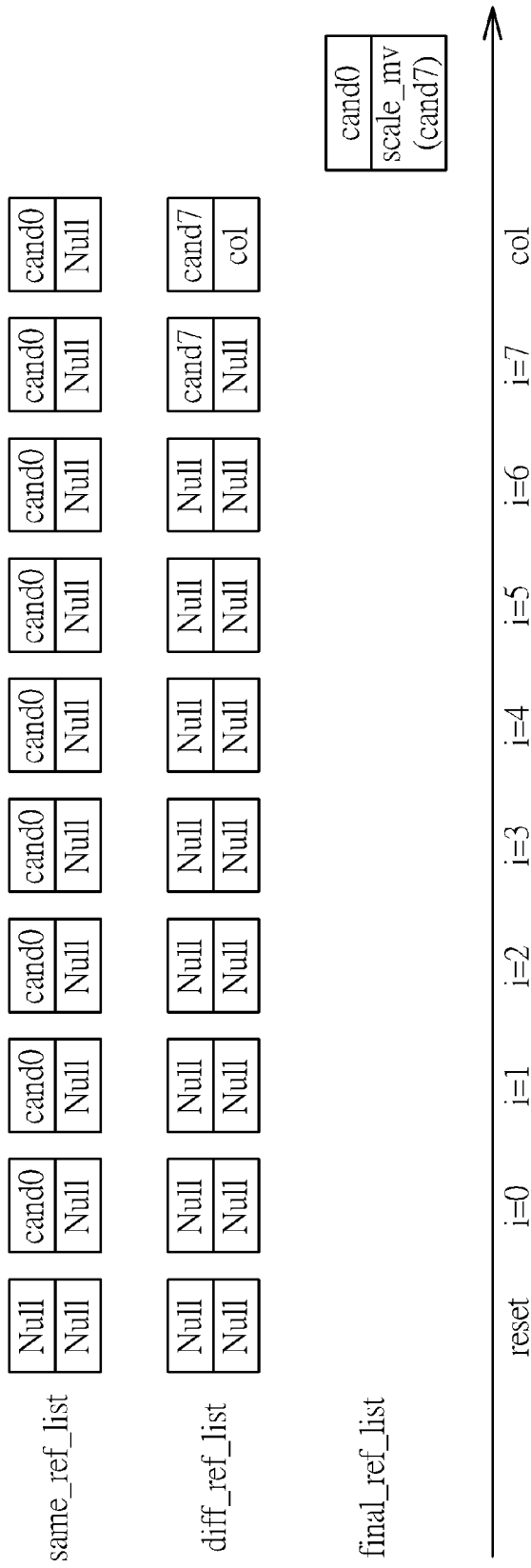
FIG. 9 is a diagram illustrating a motion vector predictor derivation example according to the second design.

FIG. 9 is a diagram illustrating an MVP derivation example according to the second design. In this example, each of the first predictor list same_ref_list, the second predictor list diff_ref_list, and the final predictor list final_ref_list is a 2-entry predictor list capable of storing two candidate MVPs. Initially, these predictor lists are reset. Syntax elements derived from processing a bitstream may include information indicative of a designated reference frame for a current block to be decoded in an inter-prediction mode. The first stage is performed to sequentially check candidate MVPs (denoted by cand0-cand7) of spatial neighbors (e.g., $N_0$-$N_7$ shown in FIG. 3) and a candidate MVP (denoted by col) of one temporal neighbor (e.g., T shown in FIG. 3) to search for valid reference MVPs pointing to reference blocks within the same designated reference frame of the current block and valid reference MVPs pointing to reference blocks within different references (which are not the designated reference frame of the current block). For example, the priority of scanning candidate MVPs of spatial neighbors may be higher than the priority of scanning the candidate MVP of one temporal neighbor, and candidate MVPs of spatial neighbors may be scanned in order. When the first predictor list same_ref_list is not full yet, any candidate MVP found qualified as a valid reference frame (e.g., any candidate MVP pointing to the designated reference frame and/or satisfying a predetermined criterion) is added to the first predictor list same_ref_list. In addition, when the second predictor list diff_ref_list is not full yet, any candidate MVP found qualified as a valid reference MVP (e.g., any candidate MVP pointing to a different reference frame and/or satisfying a predetermined criterion) is added to the second first predictor list same_ref_list.

As shown in FIG. 9, when the candidate MVP cand0 of the spatial neighbor $N_0$ is checked by the MVP computing circuit 802, the candidate MVP cand0 is qualified as a valid reference MVP and is added to the first predictor list same_ref_list, where the second predictor list diff_ref_list is still empty since the candidate MVP cand0 is not added to the second predictor list diff_ref_list.

When each of candidate MVPs cand1-cand6 of the following spatial neighbors $N_1$-$N_6$ is checked by the MVP computing circuit 802, the candidate MVP is not qualified as a valid reference MVP and is not added to any of the first predictor list same_ref_list and the second predictor list diff_ref_list. Hence, at the end of checking the candidate MVP cand6 of the spatial neighbor $N_6$, the first predictor list same_ref_list stores one candidate MVP cand0 only, and the second predictor list diff_ref_list is still empty.

When the candidate MVP cand7 of the spatial neighbor $N_7$ is checked by the MVP computing circuit 802, the candidate MVP cand7 is qualified as a valid reference MVP and is added to the second predictor list diff_ref_list, where the first predictor list same_ref_list still stores one candidate MVP cand0 since the candidate MVP cand7 is not added to the first predictor list same_ref_list. Hence, at the end of checking the candidate MVP cand7 of the spatial neighbor $N_7$, the first predictor list same_ref_list stores one candidate MVP cand0 only, and the second predictor list diff_ref_list stores one candidate MVP cand7 only.

When the candidate MVP col of the temporal neighbor T is checked by the MVP computing circuit 802, the candidate MVP col is qualified as a valid reference MVP and is added to the second predictor list diff_ref_list, where the first predictor list same_ref_list still stores one candidate MVP cand0 since the candidate MVP col is not added to the first predictor list same_ref_list. Hence, at the end of checking the candidate MVP col of the temporal neighbor T, the first predictor list same_ref_list stores one candidate MVP cand0 only, and the second predictor list diff_ref_list stores two candidate MVP cand7 and col.

Next, the MVP computing circuit 802 refers to the first predictor list same_ref_list and the second predictor list diff_ref_list finally updated by the first stage to set the final predictor list final_ref_list. In this example, the priority of selecting candidate MVPs from the first predictor list same_ref_list is higher than the priority of selecting candidate MVPs from the second predictor list diff_ref_list. Further, regarding each of the first predictor list same_ref_list and the second predictor list diff_ref_list, the priority of selecting one spatial neighbor's candidate MVP $cand_i$ from a predictor list is higher than the priority of selecting another spatial neighbor's candidate MVP $cand_j$ from the same predictor list, where $i < j$; and the priority of selecting one spatial neighbor's candidate MVP $cand_i$ from a predictor list is higher than the priority of selecting the temporal neighbor's candidate MVP col from the same predictor list. As can be shown in FIG. 9, the candidate MVP cand0 selected from the first predictor list same_ref_list is added to the first entry of the final predictor list final_ref_list, and the candidate MVP cand7 selected from the second predictor list diff_ref_list is scaled and then added to the second entry of the final predictor list final_ref_list. If the final predictor list final_ref_list is not filled with reference MVPs according to the first predictor list same_ref_list and the second predictor list diff_ref_list, (0, 0) vector(s) may be used. After the final predictor list final_ref_list is determined, MVP derivation of the current block is complete without performing a second stage following the first stage.

Figure 10:
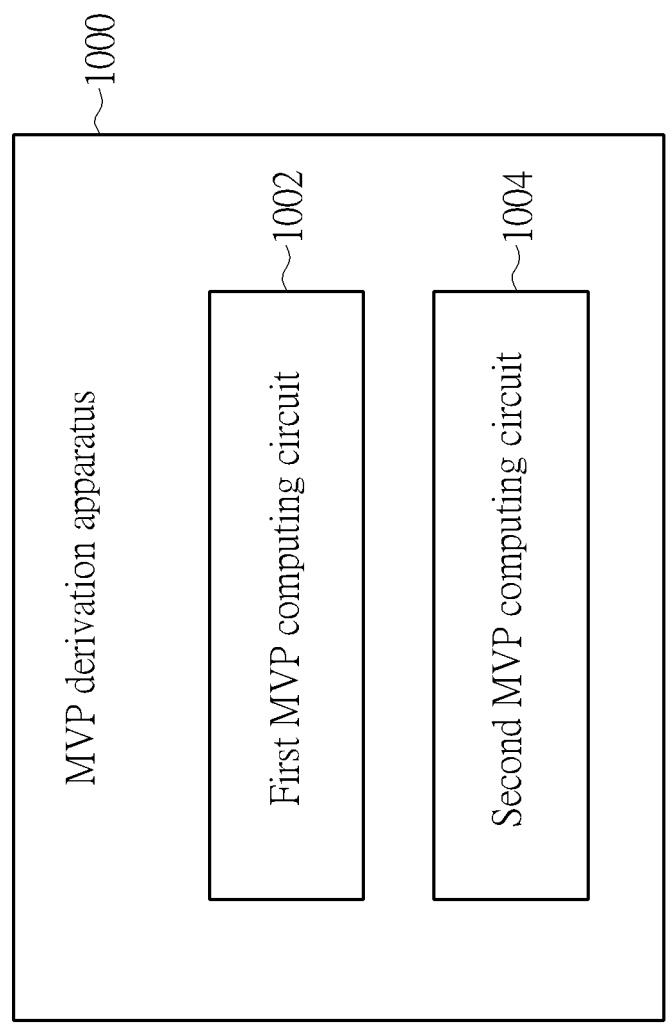
FIG. 10 is a diagram illustrating a third motion vector predictor derivation apparatus according to an embodiment of the present invention.

FIG. 10 is a diagram illustrating a third MVP derivation apparatus according to an embodiment of the present invention. For example, the MVP derivation apparatus 124 shown in FIG. 1 may be implemented using the MVP derivation apparatus 1000 shown in FIG. 10. As shown in FIG. 10, the MVP derivation apparatus 1000 includes a plurality of MVP computing circuits such as a first MVP computing circuit 1002 and a second MVP computing circuit 1004. The first MVP computing circuit 1002 is arranged to perform an L0 MVP derivation of a current block in a compound MV mode. The second MVP computing circuit 1004 is arranged to perform an L1 MVP derivation of the current block in the compound MV mode. In this embodiment, the L0 MVP derivation and the L1 MVP derivation are performed by the first MVP computing circuit 1002 and the second MVP computing circuit 1004 in a parallel processing fashion. That is, one of L0 MVP derivation and L1 MVP derivation is not required to be started after the other of L0 MVP derivation and L1 MVP derivation is complete. It should be noted that proposed parallel MVP derivation design may be employed in best MVP derivation flows of the L0 MVP derivation and the L1 MVP derivation, and/or the sub-block MVP derivation flows of the L0 MVP derivation and the L1 MVP derivation.

In a compound MV mode, there will be 2 motion vectors for each block (MI unit), namely mv_L0 and mv_L1. For example, regarding any MI unit size, VP9 will perform an L0 best MVP derivation flow to find one L0 best MVP, and perform an L1 best MVP derivation flow to find one L1 best MVP. In a case where an MI unit size is not smaller than 8×8, the L0 best MVP is directly referenced to determine one motion vector mv_L0, and the L1 best MVP is directly referenced to determine the other motion vector mv_L1. In another case where an MI unit size is smaller than 8×8, an additional L0 sub-block MVP derivation flow will be performed to find one L0 sub-block MVP for each sub-block within one 8×8 block, and an additional L1 sub-block MVP derivation flow will be performed to find one L1 sub-block MVP for each sub-block within one 8×8 block. The L0 best MVP and an L0 sub-block MVP of a sub-block with the MI unit size may be involved in determining the motion vector mv_L0 of the sub-block. In addition, the L1 best MVP and an L1 sub-block MVP of a sub-block with the MI unit size may be involved in determining the other motion vector mv_L1 of the sub-block.

If the L0 best MVP derivation flow and the L1 best MVP derivation flow are performed in a serial processing fashion, an extra 100% timing overhead is required due to one of the L0 best MVP derivation flow and the L1 best MVP derivation flow is not started until the other of the L0 best MVP derivation flow and the L1 best MVP derivation flow is complete. Similarly, if the L0 sub-block MVP derivation flow and the L1 sub-block MVP derivation flow are performed in a serial processing fashion, an extra 100% timing overhead is required due to one of the L0 sub-block MVP derivation flow and the L1 sub-block MVP derivation flow is not started until the other of the L0 sub-block MVP derivation flow and the L1 sub-block MVP derivation flow is complete. Hence, if a frame contains a large number of blocks encoded with the compound MV mode, the inter-prediction operation has a considerable time usage, thus becoming a critical performance bottleneck of a video decoding system. Thus, the present invention proposes using the MVP derivation apparatus 1000 configured to reduce the processing time of the L0 MVP derivation and the L1 MVP derivation according to a third design. In accordance with the third design, the L0 MVP derivation and the L1 MVP derivation can be processed in parallel due to the fact that there is neither calculation dependency nor data dependency between the L0 MVP derivation and the L1 MVP derivation.

Figure 11:
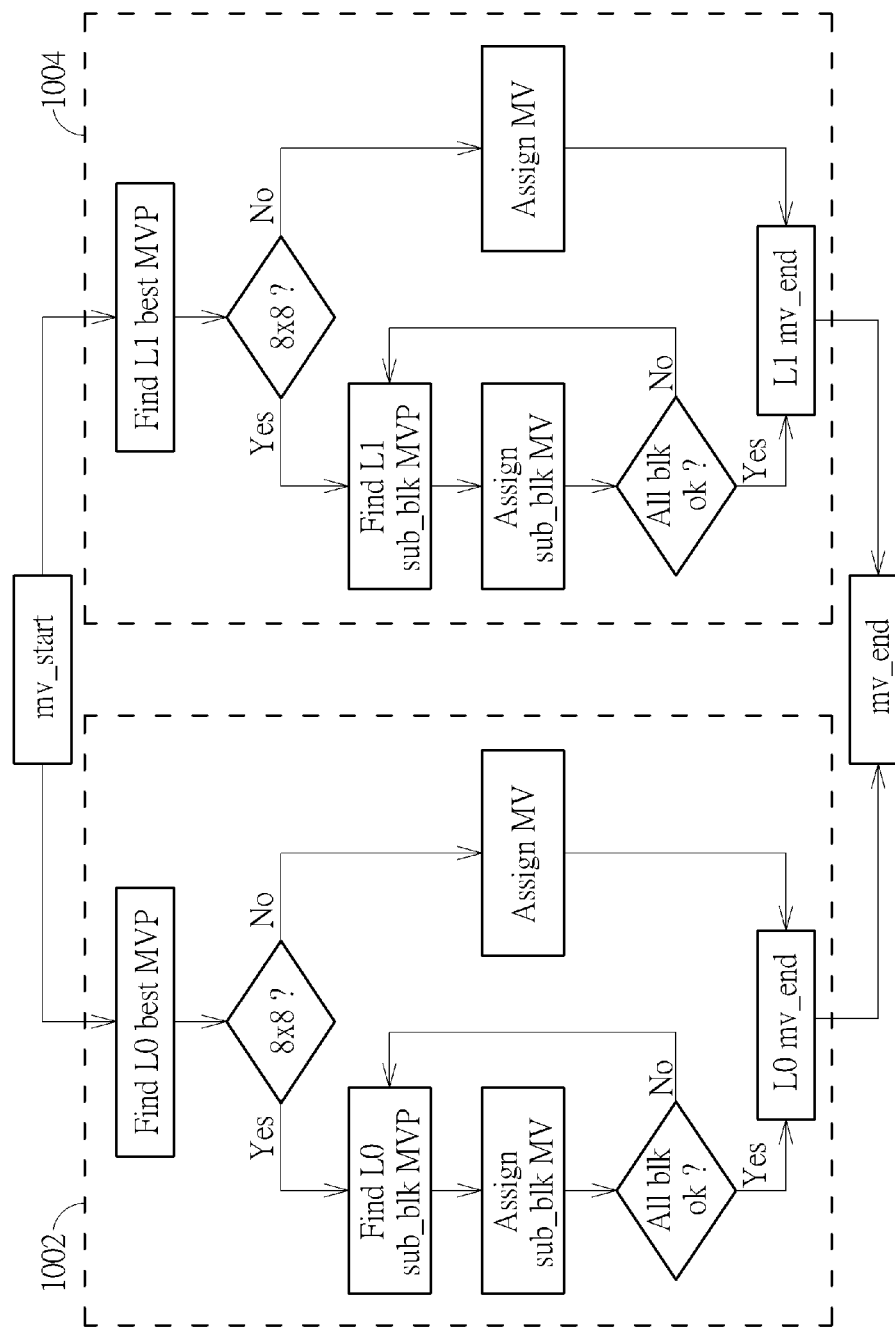
FIG. 11 is a diagram illustrating a motion vector predictor derivation example according to the third design.

FIG. 11 is a diagram illustrating an MVP derivation example according to the third design. In this embodiment, the first MVP computing circuit 1002 and the second MVP computing circuit 1004 can respectively perform the L0 best MVP derivation flow and the L1 best MVP derivation flow in a parallel processing fashion. That is, execution of one of L0 best MVP derivation flow and L1 best MVP derivation flow does not need to wait for execution of the other of L0 best MVP derivation flow and L1 best MVP derivation flow. When the MI unit size is smaller than 8×8, the first MVP computing circuit 1002 and the second MVP computing circuit 1004 can perform the L0 sub-block MVP derivation flow and the L1 sub-block MVP derivation flow in a parallel processing fashion. That is, execution of one of L0 sub-block MVP derivation flow and L1 sub-block MVP derivation flow does not need to wait for execution of the other of L0 sub-block MVP derivation flow and L1 sub-block MVP derivation flow. When the proposed parallel MVP derivation design is employed, the timing overhead induced by the compound MV mode can be avoided and the processing time of MVP derivation can be effectively reduced, which is beneficial to a high performance video decoding system.

In above embodiments, the proposed techniques of above-mentioned MVP derivation are independently implemented in different MVP derivation apparatuses. However, this is for illustrative purposes only, and is not meant to be a limitation of the present invention. In other embodiments, at least two of the proposed techniques of above-mentioned MVP derivation may be jointly implemented in one MVP derivation apparatus. These alternative designs also fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for motion vector predictor derivation of a block, comprising:
   during a same-reference-frame stage of the motion vector predictor derivation, scanning a plurality of candidate motion vector predictors derived from neighbors of the block, and generating a determination result by determining if any candidate motion vector predictor scanned in the same-reference-frame stage is qualified for a different-reference-frame stage of the motion vector predictor derivation; and
   referring to the determination result to selectively enable the different-reference-frame stage following the same-reference-frame stage;
   wherein when a predictor list is not filled with valid reference motion vector predictors found by the same-reference-frame stage after the same-reference-frame stage is complete, and the determination result indicates that at least one candidate motion vector predictor scanned in the same-reference-frame stage is not qualified for the different-reference-frame stage following the same-reference-frame stage, scanning said at least one candidate motion vector predictor in the different-reference-frame stage is skipped.

2. The method of claim 1, wherein referring to the determination result to selectively enable the different-reference-frame stage comprises:
   when the determination result indicates that none of the candidate motion vector predictors derived from the neighbors of the block is qualified for the different-reference-frame stage, skipping the different-reference-frame stage.

3. The method of claim 1, wherein generating the determination result comprises:
   keeping track of at least one candidate motion vector predictor qualified for the different-reference-frame stage; and
referring to the determination result to selectively enable the different-reference-frame stage comprises:
   during the different-reference-frame stage, scanning the at least one candidate motion vector predictor determined in the same-reference-frame stage only.

4. The method of claim 3, wherein a number of the at least one candidate motion vector predictors qualified for the different-reference-frame stage is smaller than a number of the candidate motion vector predictors scanned in the same-reference-frame stage.

5. The method of claim 3, wherein keeping track of the at least one candidate motion vector predictor comprises:
when a candidate motion vector predictor derived from one of the neighbors points to a reference block in a specific reference frame different from a designated reference frame of the block, recording the candidate motion vector predictor as one candidate motion vector predictor qualified for the different-reference-frame stage.

6. The motion vector predictor derivation method of claim 1, wherein the neighbors comprise a plurality of spatial neighbors of the block and at least one temporal neighbor of the block.

7. The method of claim 1, wherein the motion vector predictor derivation is arranged to find a best motion vector predictor for the block regardless of a size of the block.

8. The method of claim 1, wherein the motion vector predictor derivation is arranged to find a sub-block motion vector predictor for the block with a size smaller than a predetermined block size.

9. A motion vector predictor derivation apparatus, comprising:
a motion vector predictor computing circuit, arranged to scan a plurality of candidate motion vector predictors derived from neighbors of a block during a same-reference-frame stage of motion vector predictor derivation of the block, and arranged to refer to a determination result to selectively enable a different-reference-frame stage following the same-reference-frame stage; and a checking circuit, wherein during the same-reference-frame stage of the motion vector predictor derivation, the checking circuit is arranged to generate the determination result by determining if any candidate motion vector predictor scanned in the same-reference-frame stage is qualified for the different-reference-frame stage of the motion vector predictor derivation;

wherein when a predictor list is not filled with valid reference motion vector predictors found by the same-reference-frame stage after the same-reference-frame stage is complete, and the determination result indicates that at least one candidate motion vector predictor scanned in the same-reference-frame stage is not qualified for the different-reference-frame stage following the same-reference-frame stage, scanning said at least one candidate motion vector predictor in the different-reference-frame stage is skipped by the motion vector predictor computing circuit.

* * * * *